United States Patent [19]

Boy

[11] Patent Number: 4,769,736

[45] Date of Patent: Sep. 6, 1988

[54] GAS DISCHARGE SURGE ARRESTER

[75] Inventor: Jüergen Boy, Berlin, Fed. Rep. of Germany

[73] Assignee: Siemens Aktiengesellschaft, Berlin and Munich, Fed. Rep. of Germany

[21] Appl. No.: 63,961

[22] Filed: Jun. 19, 1987

[30] Foreign Application Priority Data

Jun. 25, 1986 [DE] Fed. Rep. of Germany ....... 3621254

[51] Int. Cl.[4] .............................................. H02H 9/06

[52] U.S. Cl. .................................... 361/120; 361/129

[58] Field of Search ............... 361/117, 119, 120, 124, 361/129; 313/306, 325, 355

[56] References Cited

U.S. PATENT DOCUMENTS

| | | | |
|---|---|---|---|
| 3,649,874 | 3/1972 | Peche | 361/120 |
| 3,710,191 | 1/1973 | Peche | 361/120 |
| 3,878,423 | 4/1975 | Hill et al. | 313/267 |
| 4,015,172 | 3/1977 | Peche et al. | 361/129 |
| 4,123,682 | 10/1978 | Lange et al. | 361/120 |
| 4,266,260 | 5/1981 | Lange et al. | 361/120 |
| 4,407,849 | 10/1983 | Haas et al. | 361/120 |
| 4,433,354 | 2/1984 | Lange et al. | 361/129 |
| 4,578,733 | 3/1986 | Shigemori et al. | 361/120 |
| 4,583,147 | 4/1986 | Boy et al. | 361/124 |
| 4,644,441 | 2/1987 | Igarashi . | |

FOREIGN PATENT DOCUMENTS 2417025 10/1975 Fed. Rep. of Germany .

*Primary Examiner*—A. D. Pellinen
*Assistant Examiner*—Jeffrey A. Gaffin
*Attorney, Agent, or Firm*—Hill, Van Santen, Steadman & Simpson

[57] ABSTRACT

A surge arrester which has activating compound applied in recesses outside of an ignition gap. The distance between the recesses of two electrodes in the surge arrester is distinctly greater than the width of the ignition gap form by the electrodes. The ignition gap is not effected by deforming of the activating compound and therefore an associated change in the ignition voltage does not occur. These surge arresters are particularly suited for very small electrode spacing.

10 Claims, 3 Drawing Sheets

GAS DISCHARGE SURGE ARRESTER

BACKGROUND OF THE INVENTION

This invention relates in general to a gas discharge surge arrester.

Surge arresters are known in the prior art which are housed in a vacuum-tight housing structure and having at least one cylindrical insulating ring with first and second electrodes and an ignition gap located between the two electrodes, wherein at least a first electrode is partially covered with an activating layer and wherein the electron work function of the activating layer is lower than that of the electrode material. Such a surge arrester is disclosed in U.S. Pat. No. 3,649,874. A three-electrode surge arrester of similar construction is disclosed in U.S. Pat. No. 3,710,191. Both patents disclose surge arresters in which an activating layer is arranged in discharge gaps where it reduces the electron work function.

The present invention overcomes the drawbacks of the prior art and provides improvements which consist in reducing the divergence of the electrical values, in particular the response voltage, of surge arresters during their life duration. Furthermore, operational reliability of these surge arresters is improved with the present invention.

SUMMARY OF THE INVENTION

It is known that when heated, for example, when the surge arrester responds, the activating layers become deformed and can form elevations or globules which in the prior art influenced the ignition voltage or can even jeopardize the insulation of the surge arrester.

In accordance with the present invention, it is sufficient to ignite the discharge in the gap. As soon as the electrode provided with an activating layer operates as a cathode, at high currents the base point of the discharge in a surge arrester utilizing the present invention travels to the junction between the activating layer and the uncovered electrode material. Even when the latter is arranged outside of the gap and the discharge path is distinctly lengthened the effect can still take place. Because of the greater distance from the counter electrode, in the proposed embodiment of the present invention, a deformation of the activating layer has no influence upon the ignition voltage.

For surge arresters which are loaded only with unipolar pulses, it is sufficient to provide the electrode which serves as a cathode with an activating layer. This can be advantageously achieved in an embodiment in which the first electrode contains a bore into which the second electrode projects. An annular ignition gap therefore remains between the two electrodes, and an insulating gap remains between the end faces of the second electrode and the base of the bore in the first electrode. Here, the ignition gap is narrower than the insulation gap, wherein an activating layer is located in, for example, honeycomb-like recesses on the annular end face of the first electrode, and where the activating layer does not extend to the inner edge of the end face.

In an embodiment suitable for alternating current, an activating layer is likewise arranged on the end face of the second contact and does not extend to the edge of that end face. An advantageous embodiment consists in that the bore in the first electrode is cylindrical and the second electrode has the cylindrical component which forms an annular gap of constant width in relation to the inner walls of the bore. Another embodiment which is advantageous has a bore which is delimited by an approximately conical wall and wherein the second electrode has a conical tip which forms a gap of constant width with a conical wall. An embodiment suitable for alternating current has a bore in the first electrode delimited by a truncated-cone-shaped wall which continues into a cylindrical wall having a small diameter and in that the second electrode has a truncated-cone-shaped component, whose generated surface forms a gap of constant width with the truncated-cone-shaped component of the bore. The end face of the truncated-cone-shaped component is provided with an activating layer which does not extend to the edge of the end face. This embodiment is simple to produce, because of the truncated-cone-shaped gap boundaries result in a relatively low tolerance of the gap dimensions in the axial direction. This fulfills the spacing requirements for the activating layer at the end face of the second electrode.

The invention is particularly advantageous if the activating compound is heated by high current loads to such an extent that the danger of the formation of spheres or drops is particularly great. Such operating situations frequently occur in so-called three-electrode arresters, that is in surge arresters in which a first electrode and a second electrode are arranged coaxially with one another and each comprises a cylindrical component, with the end faces of the cylindrical components arranged opposite one another to form a subsidiary discharge gap. In this three-electrode arrester, a third electrode contains a cylindrical bore, the boundary of which is concentric with the cylindrical components of the first and second electrodes and surrounds the subsidiary discharge gap, wherein at each end face of the third electrode, at least one annular face is provided with an activating layer. The end faces of the first and second electrodes are also each provided with activating layers. Here, the activating layers advantageously consist of sodium silicate and are accomodated and fused in grooves, honeycomb pyramids, bores, etc. Sodium silicate activating layers result in favorable surge arrester characteristic values in the fused stated and adhere well to the base, but are also relatively likely to form globules or droplets. They can be used particularly advantageously in a surge arrester corresponding to the present invention.

For the fuse protection of conductors, it is particularly suitable to use an embodiment of a three-electrode arrester in which first and second electrodes are arranged coaxially with one another and each comprises a cylindrical component. In this embodiment, the end faces of the cylindrical components are arranged opposite one another and form a subsidiary discharge gap, where a third electrode contains a cylindrical bore which is arranged so as to be concentric with the cylindrical components of the first and second electrodes and encloses the ignition gap. The bore in the third electrode is provided with trapezoidal threading and the threads are partially filled with an electrode activating compound in such manner that the activating compound has not reached the wall of the cylindrical bore. Here, the end faces of the first and second electrodes each have one zone provided with an activating layer. A main discharge gap is defined by the edge of the activating compound which is located in the trapezoidal threading. It is wider than the ignition gap which is defined by those parts of the cylindrical wall which remain between the threads of the trapezoidal threading. As a result, this special embodiment exhibits a low divergence of the ignition voltage values. In the spiral design, it is also ensured that on a part of the periphery, commencing from the activating layers of the first and second electrodes, the metallic surface of the third electrode is reached by the shortest path if the first and second electrodes act as cathodes. As the activating compound in the trapezoidal threading does not reach the edge of the threaded profile, and if a third electrode operates as cathode, the cathode base point is located in the trapezoidal threading. Deformation of the electrode or of the activating compound results therefore in no change in the ignition gap, and thus does not effect the ignition behavior of the arrester.

The described three-electrode surge arresters mainly serve to fuse protect two wires, which carry the same potential in close proximity and are connected to the first and second electrodes, in relation to earth which is connected to the third electrode. Accordingly, only relatively small voltage differences occur between the first and second electrodes, and it is unnecessary for the subsidiary discharge gap, located between these electrodes, to fulfill high requirements. Therefore, the invention is employed only in respect of the main discharge gap between the first and second electrodes on the one hand and the third electrode on the other hand. As soon as a discharge occurs between the first and second electrode and the third electrode, the main discharge gap between the first and second electrodes which has not yet ignited and the third electrode is also ionized so that its voltage is likewise reduced. Therefore, this avoids a noticible discharge between the first and second electrodes, and the subsidiary discharge gap between the end faces of these two electrodes is unable to assume high current values.

BRIEF DESCRIPTION OF THE DRAWINGS

The features of the present invention which are believed to be novel, are set forth with particularly in the appended claims. The invention, together with further objects and advantages, may best be understood by reference to the following description taken in conjunction with the accompanying drawings, in the several Figures in which like reference numerals identify like elements, and in which:

BRIEF DESCRIPTION OF THE PREFERRED EMBODIMENT

The present invention has general applicability but is most advantageously utilized in surge arresters having two or three-electrodes.

Figure 1:
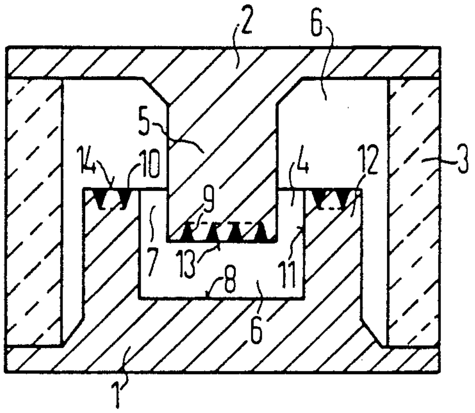
FIG. 1 is a cross-sectional side view of a two electrode arrester.
Figure 2:
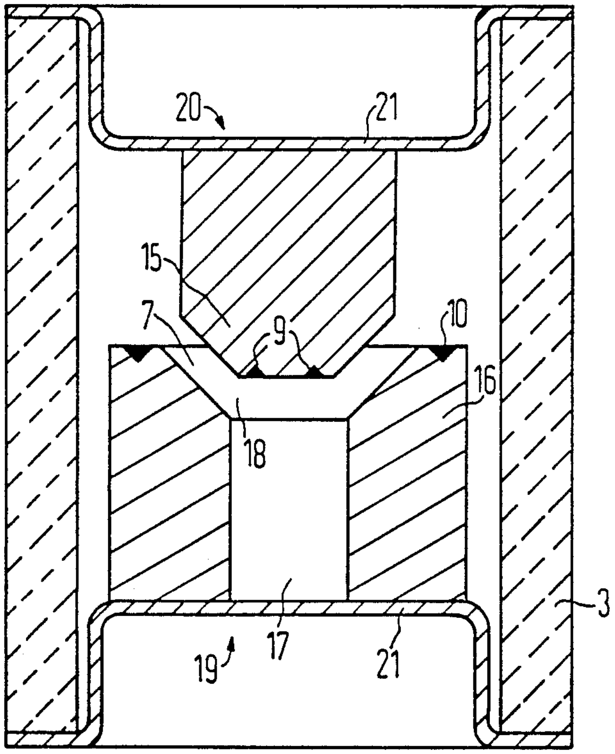
FIG. 2 is a cross-sectional side view of an alternative embodiment of a two electrode arrester.

Referring now to FIGS. 1 and 2, a surge arrester is composed of a first electrode 1, a second electrode 2, and an insulating ring 3, preferably consisting of ceramic, and is sealed in a vacuum-tight fashion. The first electrode 1 contains a bore 4 into which projects a cylindrical component 5 of the second electrode 2. Between the inner wall 11 of the hollow cylinder component 12 of the electrode 1, formed by the bore 4, and the outer surface is a cylindrical component 5 of the electrode 2, there is formed an ignition gap 7 in the region of which no activating layer is applied to the electrodes. An insulation gap 6, which is distinctly wider than the ignition gap 7, is located in each case between the base surface 8 of the bore 4 and the end face 13 of the electrode 2, and between the end face 14 of the first electrode 1 and the adjacent components of the second electrode 2.

The end face 14 of the hollow cylindrical component 12 of the first electrode 1 and the end face 13 of the cylindrical component 5 of the second electrode 2 are each provided with annular channels 10 and 9, respectively, which are filled with an activating compound. In the illustrated example, two rings 10 and 9 are arranged in the end faces 14 and 13, respectively. In this embodiment, following the ignition in the gap 7, a gas discharge occurs from those edges of the recesses 10 and 9 close to the axis across the ignition gap 7, whereby the base is located at the boundary between the activating layer and the metal of the electrode, and on the anode side a relatively large area is available for the entry of current into the counterelectrode. In place of the channels other recesses, such as small honeycomb pyramids, filled with activating compound can be impressed into the end faces 14 and 13.

After the ignition procedure, the discharge can also take place across the insulation gap 6 and a deformation of the activating compound in the channels 9 results in no change in the ignition voltage. As a result, this embodiment is particularly suitable for high current values.

As shown in FIG. 2, tolerances in the axial direction have little influence upon the gap width and thus upon the ignition voltages. Here, the ignition gap 7 is arranged between a truncated-cone-shaped component 15 of a second electrode 20 and a truncated-cone-shaped bore 18 in a first electrode 19. The cylindrical component 16 of the first electrode 19 also contains a bore 17 which is coaxial with the bore 18 and which continues into the truncated-cone-shaped bore 18 on its smaller boundary plane. Even in the case of very small widths of the ignition gap 7 of 0.5 mm or less, there is sufficient space in the bore 17 for the deformation of the activating compound in the ring shaped channel 9. The same applies to the deformation of the activating compound in the channel 10 of the electrode 19 into the rear area of the electrode 20.

The electrodes in FIG. 1 and the cylindrical components of the electrodes in FIG. 2 advantageously consist of copper. The embodiment in FIG. 2 permits use of an alloy for the cup-shaped fixing components 21 of the electrodes 19 and 20, whose temperature coefficient is adapted in a known manner to the temperature coefficients of the insulating ring which preferably consist of ceramic.

Figure 3:
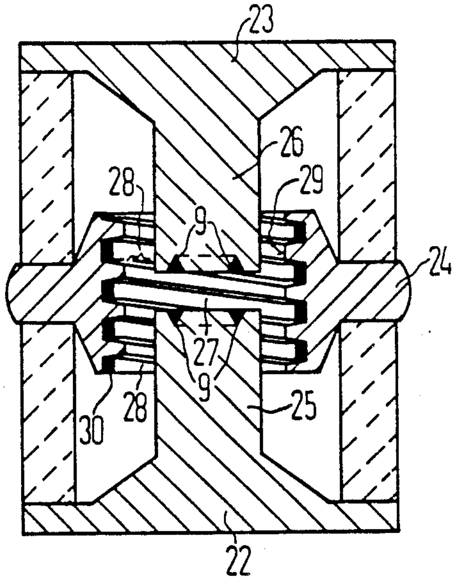
FIG. 3 is a cross-sectional side view of a three-electrode arrester.

Referring now to FIG. 3, a three-electrode surge arrester is depicted which is particularly suitable for protecting two conductors, loaded with currents, from the earth potential connected to the third electrode. Cylindrical components 25 and 26 of the electrodes 22 and 23 extend into a bore in the third electrode 24. The end faces of the first electrode 22 and the second electrode 23 form a subsidiary discharge gap 27. The main discharge gap 28 is formed in the annular gap between the cylindrical components 25 and 26 and a cylindrical inner wall 29 of the third electrode 24. The end faces of the cylindrical components 25 and 26 each contain a channel 9 filled with activating compound. The inner wall 29 of the third electrode 24 is provided with trapezoidal threading 30 filled with activating compound. The ignition gap is defined by those parts of the inner wall 29 which remain between the trapezoidal threading and extend to the corresponding cylindrical components 25 and 26.

This construction ensures that independently of tolerances of the dimensions in the axial direction, a discharge with a cathode base point in one of the channels 9 of the first or second electrodes 22 or 23 reaches a metallic surface of the inner wall of third electrode 24 by the shortest path in the radial direction. On the other hand, ample activating compound is available for the discharges with a cathode base point on a third electrode 24, so that this direction of discharge is rapid and requires a particularly low arc burning voltage. In this embodiment the advantages of the invention relating to high energy discharges are advantageously combined with the advantageous of conventional technology, namely a very low arc burning voltage. Other forms of recesses, such as honeycomb pyramids can be used in place of the channel 9 in the end faces of the electrodes 22 and 23.

Figure 4:
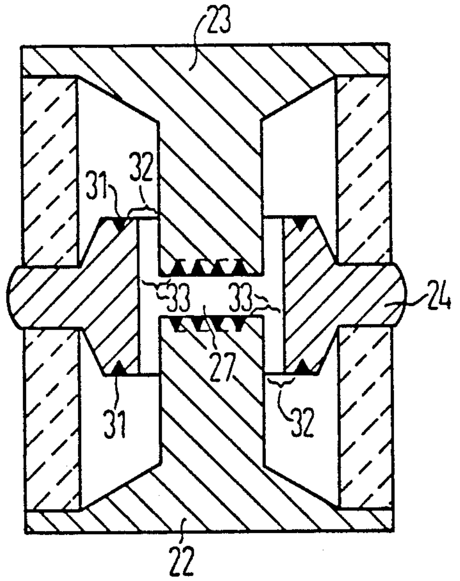
FIG. 4 is a cross-sectional side view of an alternative embodiment of a three-electrode arrester.

FIG. 4 is a diagram of a three-electrode arrester in which the third electrode 24 also contains an annular channel 31 at each of its end faces. Therefore, in this embodiment the activating compounds for all of the electrodes 22, 23 and 24 are arranged outside of the actual discharge gap 28.

In both FIGS. 3 and 4, a high-energy discharge is unlikely to occur in the subsidiary discharge gap 27, as arresters of the type in question specify that surge voltages be discharged to earth potential. Therefore, even in the case of relatively small voltage differences, a discharge occurs in the main discharge gap 28 in the case of FIG. 3 and along the main discharge gaps 32 or 33 in the case of FIG. 4.

Figure 5:
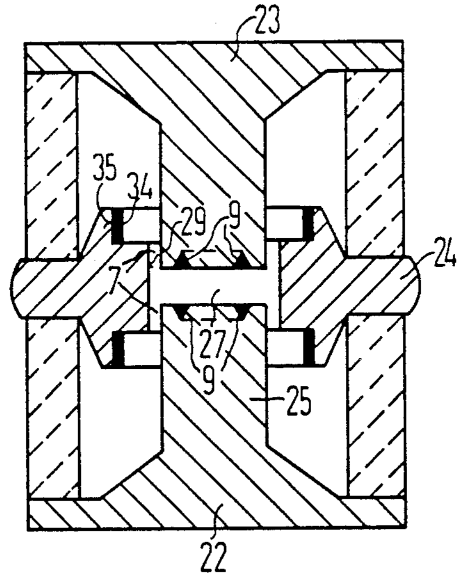
FIG. 5 is a cross-sectional side view of yet another alternative embodiment of a three-electrode arrester.

Referring now to FIG. 5, the inner wall 29, together with the cylindrical components 25 and 26 of the electrodes 22 and 23 form an ignition gap 7 which adjoins the subsidiary discharge gap 27. In the region of the end faces 36 of the third electrode 24, the bore comprises a cylindrical widened portion 35. The outer surface of the cylindrical widened portion 35 is coated with activating compound 34 which does not reach the inner wall 29. This embodiment is relatively simple to produce and has the advantages of the embodiment shown in FIG. 3.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A gas discharge surge arrester having a vacuum-tight housing which contains at least one cylindrical insulating ring, first and second electrodes, and an ignition gap located between said two electrodes, wherein at least a first electrode is partially covered with an activating layer, and wherein an electron work function of the activating layer is lower than that of the electrodes, comprising said activating layer arranged outside of the ignition gap in recesses, a smallest distance from the edge of the activating layer to the adjacent electrode being greater than the width of the ignition gap.

2. A surge arrester as claimed in claim 1, wherein the first electrode contains a bore into which the second electrode projects, such that an annular gap remains between the two electrodes, and insulation gaps are formed between an end face of the second electrode and a base surface of a bore in the first electrode and between an end face of the first electrode and adjacent components of the second electrode, such that the ignition gap is narrower than the insulation gap, activating compounds being applied to the annular end face of the first electrode and to the end face of the second electrode in recesses of predetermined type, wherein activating layers do not extend to an inner edge of the end faces.

3. A surge arrester as claimed in claim 1, wherein the bore in the first electrode is cylindrical and the second electrode comprises a cylindrical component which forms an annular gap of constant width in relation to the inner wall of the bore.

4. A surge arrester as claimed in claim 1, wherein the bore is delimited by an approximately conical wall and the second electrode has a conical tip which forms an ignition gap of constant width with the conical wall.

5. A surge arrester as claimed in claim 1, wherein the bore in the first electrode is delimited by a truncated-cone-shaped wall which continues into a cylindrical wall having a small diameter, and wherein the second electrode comprises a truncated-cone-shaped component, whose generated surface forms a gap of constant width with the truncated-cone-shaped component of the bore, end faces being provided with activating layers which do not extend to the edge of the end faces.

6. A surge arrester as claimed in claim 1, wherein said first and second electrodes are arranged coaxially with one another and each has a cylindrical component, such that the end faces of the cylindrical components are arranged opposite one another and form a subsidiary discharge gap, a third electrode containing a cylindrical bore which is arranged concentrically with the cylindrical components of the first and second electrodes and surrounds the subsidiary discharge gap, such that at each end face of the third electrode at least one annular surface is provided with an activating layer.

7. A surge arrester as claimed in claim 6, wherein the end faces of the first and second electrodes each comprise at least one area which is provided with an activating layer.

8. A surge arrester as claimed in claim 1, wherein the activating layers fundamentally consist of sodium silicate and are accomodated in grooves, channels or honeycomb pyramids.

9. A surge arrester as claimed in claim 1 in which said first and second electrodes are arranged coaxially with one another and each include a cylindrical component, wherein the end faces of the cylindrical components are arranged opposite one another in an axial direction and form a subsidiary discharge gap, a third electrode containing a bore which is concentric with the cylindrical components of the first and second electrodes and surrounds the subsidiary discharge gap, such that between the cylindrical components and the wall of the bore an ignition gap is formed which is narrower than the subsidiary discharge gap, the bore in the third electrode provided with trapezoidal threading, the threads containing electrode activating compound, the end faces of the first and second electrodes each including at least one area provided with an activating layer in recesses.

10. A surge arrester as claimed in claim 1 in which said first and second electrodes are arranged coaxially with one another and each includes a cylindrical component, wherein end faces of the cylindrical components are arranged opposite one another in an axial direction and form a subsidiary gap, a third electrode containing a bore which is arranged concentrically with the cylindrical components of the first and second electrodes and surrounds the subsidiary discharge gap, such that between the cylindrical components and the wall of the cylindrical bore adjoining the subsidiary discharge gap an ignition gap is in each case formed which is narrower than the subsidiary gap, in the region of the end faces of the third electrode the bore in each case comprises a cylindrical widened portion having a larger diameter, and that the wall of the widened portion is coated with activating compound.

* * * * *